Patented Feb. 24, 1931

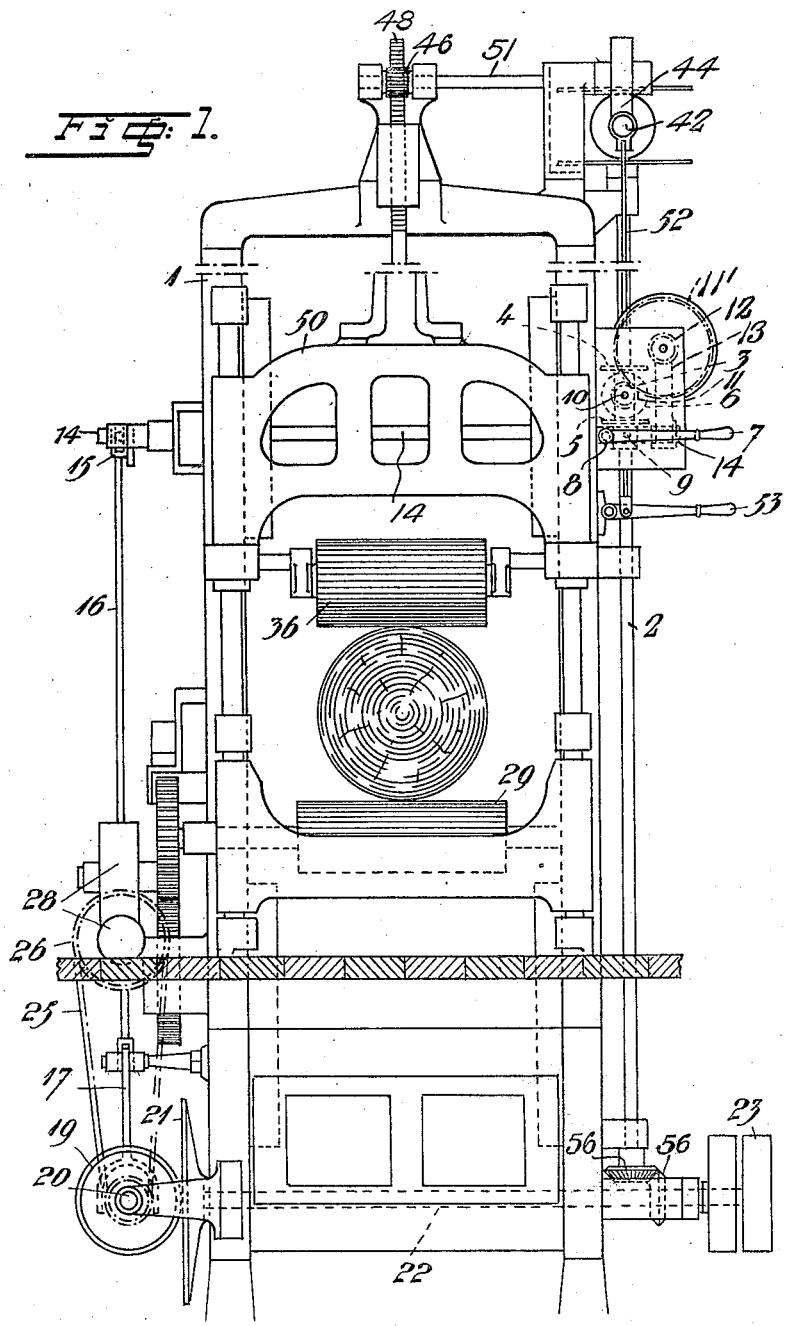

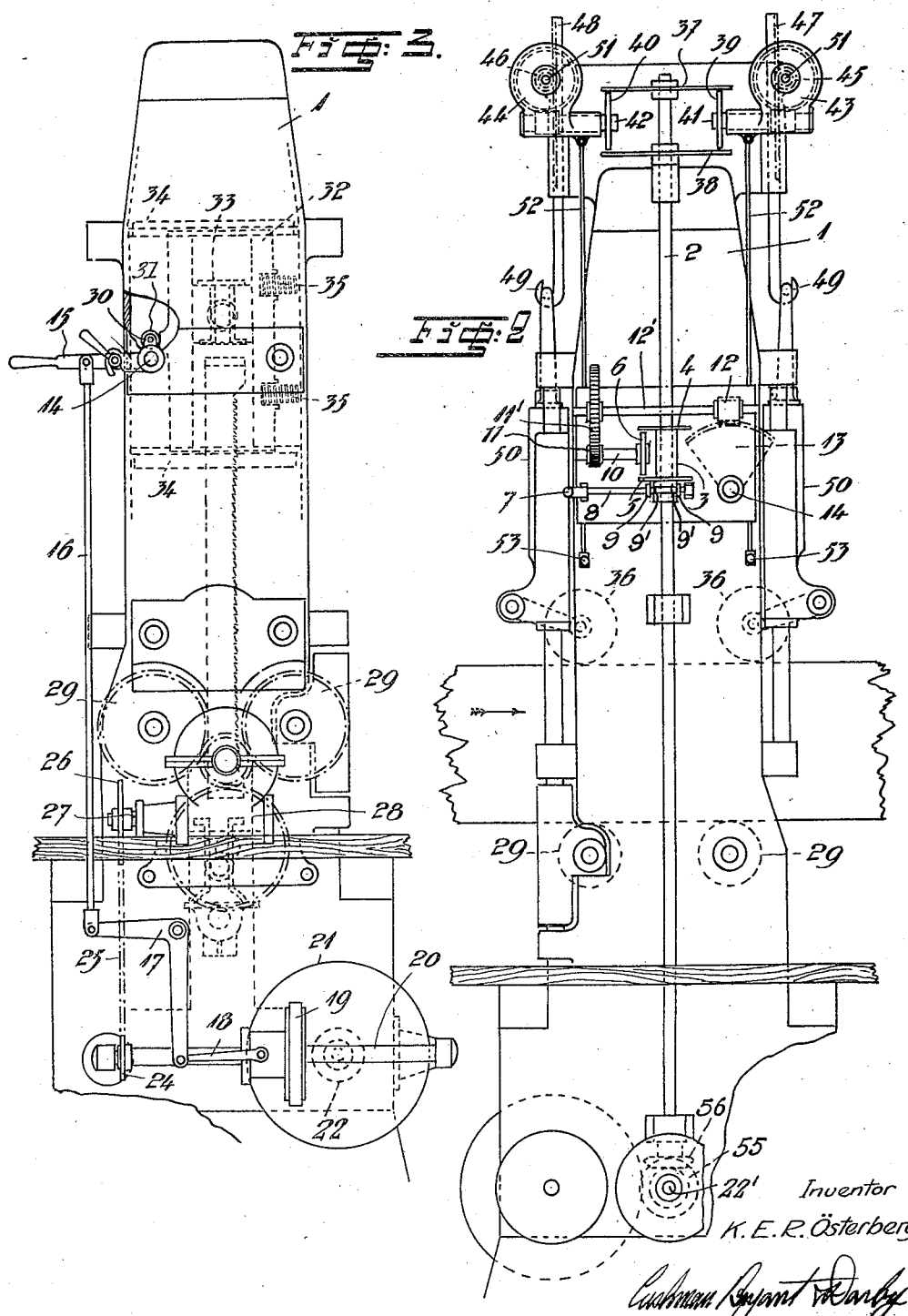

1,794,350

UNITED STATES PATENT OFFICE

KARL ERIK RUDOLF ÖSTERBERG, OF STOCKHOLM, SWEDEN, ASSIGNOR TO J. & C. G. BOLINDERS MEKANISKA VERKSTADS AKTIEBOLAG, OF STOCKHOLM, SWEDEN, A JOINT-STOCK COMPANY

SAWING-MACHINE FRAME

Application filed June 3, 1930, Serial No. 459,092, and in Sweden November 9, 1929.

The manœuvring of a sawing machine frame consists to a very great extent in the work required for adjustment of those parts of the same, which in regard to their function are dependent on the dimensions and on the nature of the timber to be sawn, as well as on the cutting capacity of the saw blades, and so forth. This adjusting work is, above all, involved in raising and lowering the feed rollers of the saw frame, adjustment of the feeding mechanism and in regulation of the blade angle. These adjustments, which hitherto have been effected manually and which have had to be repeated frequently, perhaps up to many hundred times daily, will obviously be found very trying and fatiguing. Therefore, it would be desirable to perform the adjusting work with the aid of motive power, so that the manual work is reduced to a minimum. The present invention provides for an arrangement adapted to facilitate this.

The invention is principally characterized by the feature that all those parts of the frame saw, which have to be adjusted with respect to the size of the timber, the rate of feeding, the blade angle and so forth, are connected with a power transmitting means in such a manner as to permit of being coupled, either each per se or groupwise, to the power transmitting means during the operation of the saw, in order thus to be adjusted.

According to a preferred embodiment of the invention, the power transmitting means is arranged in the form of a shaft mounted in the frame and extending along the whole height of the saw frame, said shaft being driven continuously in the same direction during the operation of the saw frame.

The accompanying drawing illustrates a form of embodiment of a saw frame arranged in the manner last stated. Fig. 1 shows the saw frame as viewed in the longitudinal direction of the sawn timber, and Figs. 2 and 3 are two opposed side elevations of the frame.

According to the invention, a countershaft 2 is mounted on the one side of the frame 1 of the saw frame, said shaft extending along the whole height of the frame, and all of the adjustable parts of the frame being connected with said shaft so as to permit of being coupled to the shaft, in order to receive the requisite power therefrom for the adjustment to be effected. Countershaft 2 is continuously rotated during operation of the machine from a power shaft 22' through bevel gears 55 and 56.

For the adjustment of the rate of feeding there is thus arranged a displaceable but non-rotatable sleeve 3 on the shaft 2, said sleeve carrying two friction disks 4 and 5. Arranged between these friction disks is a friction disk 6 adapted to be caused to cooperate with the one or the other of the disks 4 and 5, according as the sleeve 3 is displaced upwardly or downwardly on the shaft 2. The latter displacement is effected with the aid of the lever 7, which is fixed on a rock shaft 8 provided with arms 9 having pins 9' engaging in a slot extending around the sleeve 3. The friction disk 6 is secured on a shaft 10 adapted to transmit movement to a shaft 12' through gears 11 and 11', said shaft 12' transmitting movement through the worm 12 to the worm segment 13 secured on the shaft 14. On the latter is secured an arm 15 connected through a rod 16 with the bell crank lever 17, which latter is connected through a rod 18 with the friction disk 19, which is displaceable to and fro, but not rotatable on the shaft 20. The friction disk 19 cooperates with the friction disk 21 secured on the shaft 22, to which movement is transmitted through the belt pulley 23. Secured on shaft 20 is a sprocket wheel 24 adapted to transmit movement through the chain 25 onto a sprocket wheel 26 attached to the shaft 27, which is adapted to transmit movement onto the two feed rollers 29 through the worm gearing 28.

If the rate of feeding is to be altered, the operator only has to actuate the lever 7 in an upward or downward direction. Either one of the friction disks 4 or 5 is then brought into cooperation with the friction disk 6, which is brought into movement and displaces the friction disk 19 through the above described mechanical connection therewith, in such a manner with respect to the friction disk 21 that the rotational speed of the friction disk 19 and thus also the rotational speed of the feed rollers 29 will be altered, as will be readily understood from the above description with reference to the drawing.

Simultaneously with the adjustment of the feeding thus effected, adjustment of the inclination of the saw blades is also to take place, so that the so-called overhang of the blades is brought into suitable relationship to the magnitude of the feeding. To this end the shaft 14 is provided, according to the invention, with arms 30 bearing against horizontally displaceable frames 32 through the medium of slide rollers 31, said frames 32 forming the upper vertical guides of the blade frame 33. The frames 32, which are horizontally displaceable between the guides 34, are actuated by springs 35 on the side opposite to that of the slide rollers 31, said springs effecting the displacement of the frames 32 to the left, according to Fig. 3.

Simultaneously with the actuation of the lever 7, in the manner hereinbefore described, for the purpose of adjusting the feeding, whereat the shaft 14 is turned, the arms 30 connected with said shaft will thus also be swung to the right or the left, according to Fig. 3; in the first case the arms 30 will then displace the frames 32 to the right, while in the second case springs 35 will move the frames to the left. In each case the upper guides of the blade frame 33 will be adjusted in such a manner that the inclination of the blades and the overhang thereof are altered to correspond with the altered feeding.

For raising or lowering the pressure rollers 36 of the saw frame with the aid of the motive power transmitted through the shaft 2, the following arrangement is provided. Secured on shaft 2 are two friction disks 37 and 38, between which are arranged friction disks 39 and 40, the shafts 41 and 42 of which are connected through worm gearings 43 and 44 with pinions 45 and 46 respectively, which are adapted to engage toothed racks 47 and 48, respectively, arranged to be displaced up and down. The lower ends of said racks, which are formed into hooks 49, carry the roller frames 50 in which are supported the pressure rollers 36, said frame being thus adapted to be raised and lowered relative to the main frame 1. The worm gearings 43, 44, which are rotatable about the shafts 51 of the pinions 45, 46, are connected through pulling rods 52 each with one of the levers 53.

When either one of the pressure rollers 36 is to be raised or lowered, the corresponding lever 53 is actuated, the corresponding worm gearing 43 or 44 being then rotated about the corresponding shaft 51, so that the friction disk 39 or 40 connected with the gearing is brought into cooperation with the friction disk 37 or 38, in order thus to be caused to rotate in the one or the other direction. The worm gearing thus thrown in transmits the movement to the corresponding pinion 45 or 46 exerting a raising or lowering action on the corresponding toothed rack 47 and 48 and thus a raising or lowering action on the corresponding roller frame 50 and its pressure roller 36.

What I claim is:—

1. In a machine of the class described, an upright main frame, a horizontal feed roller on said main frame, a guide frame on the main frame shiftable horizontally relative thereto, a pressure roller on the main frame for cooperation with the feed roller and shiftable toward and away from the latter, power driven means, driving connections including speed changing mechanism between said power driven means and feed roller, means operable to shift said guide frame, controllable means driven from said power driven means to adjust said speed changing mechanism and actuate said guide frame shifting means, means operable to shift said pressure roller, and controllable means driven from said power driven means for actuating said pressure roller shifting means.

2. In a machine of the class described, an upright main frame, a horizontal feed roller on said main frame, a guide frame on the main frame shiftable horizontally relative thereto, a pressure roller on the main frame for cooperation with the feed roller and shiftable toward and away from the latter, power driven means, driving connections including speed changing mechanism between said power driven means and feed roller, means operable to shift said guide frame, means operable to shift said pressure roller, a countershaft driven from said power driven means, controllable means driven from said countershaft to adjust said speed changing mechanism and actuate said guide frame shifting means, and controllable means driven from said countershaft for actuating said pressure roller shifting means.

3. Structure according to claim 2 wherein the countershaft is vertically disposed and supported against longitudinal displacement.

4. Structure according to claim 2 wherein the countershaft is continuously rotated during operation of the machine.

5. Structure according to claim 2 wherein each of the said controllable means includes a pair of spaced friction driving disks on the countershaft, a driven friction disk between the driving discs, and means for selectively engaging the driving discs and the driven disk to effect rotation of the latter in either direction.

KARL ERIK RUDOLF ÖSTERBERG.